EG : Ethylene glycol

TPA : Terephthalic acid

BHET : Bis-(β-hydroxy ethyl terephthalate and prepolymer thereof

ATP : Alkyl terephthalate

V : Reaction Vessel with Oil Bath and Agitator

United States Patent Office 3,639,448
Patented Feb. 1, 1972

3,639,448
PROCESS FOR PRODUCING BIS(β-HYDROXY-ETHYL)-TEREPHTHALATE AND/OR PRE-POLYMER THEREOF
Katsuto Matsuzawa and Kazuo Matsui, Tokyo, Japan, assignors to Mitsubishi Chemical Industries, Ltd., Tokyo, Japan
Filed Dec. 21, 1967, Ser. No. 692,524
Claims priority, application Japan, Dec. 30, 1966, 42/85,798
Int. Cl. C07c 69/82
U.S. Cl. 260—475 P            5 Claims

ABSTRACT OF THE DISCLOSURE

An improvement of process for producing bis(β-hydroxyethyl)-terephthalate from terephthalic acid and ethylene glycol in which terephthalic acid dissolved or dispersed in a liquid, which is an alkyl terephthalate and/or bis(β-hydroxyethyl)-terephthalate is reacted with ethylene glycol at a temperature above the dew point of ethylene glycol.

BACKGROUND OF THE INVENTION

In the preparation of bis(β-hydroxyethyl)-terephthalate and prepolymers thereof (hereinafter referred to as BHET), many methods of direct reaction of terephthalic acid an ethylene glycol have been proposed. It is difficult to dissolve terephthalic acid in ethylene glycol; thus the reaction is a heterogeneous reaction. Accordingly, a relatively small amount of ethylene glycol, for example, about two moles of ethylene glycol per terephthalic acid, is employed. In such case terephthalic acid is merely moistened with ethylene glycol to form a moistened lump or paste which is heated to the temperature sufficient for starting the reaction. It requires a long time to reach a temperature at which reaction occurs and, also, it is difficult to agitate the reaction mixture. If an excess of ethylene glycol is employed, it improves heat transmission and makes it easier to agitate the reaction mass, but a long reaction time is still required and, furthermore, the excess ethylene glycol causes etherification and results in a product of low purity.

When the known process is carried out at atmospheric pressure, it is uneconomical since it has a low reaction rate and results in by-products.

U.S. Pat. 3,050,533 discloses esterification of ethylene glycol and terephthalic acid at a temperature over the boiling point of ethylene glycol under superatmospheric pressure.

Japanese patent publication No. 12,448/1961 discloses a process in which less than two moles of ethylene glycol is reacted with one mole of terephthalic acid at a temperature of from 235° to 240° C. and water formed in the reaction is successively removed. These processes are carried out at a temperature over the normal boiling point of ethylene glycol, accordingly, the reaction rate is increased but the ethylene glycol remains in a liquid state and the reaction mixture remains in a lumpy or pasty form. When an excess of ethylene glycol is employed, an undesirable etherification reaction cannot be avoided.

Japanese patent publication No. 22,747/1963 discloses a direct process in which heated, preferably evaporised, ethylene glycol is blown into solid terephthalate. The aim of this process is to improve heat transmission by closely contacting the reactants, but it is effective only in raising the temperature of the reactants up to a temperature at which reaction is started. It leaves unsolved the problem of agitation, and, furthermore, it is difficult to control the temperature throughout the mass during the reaction period.

SUMMARY OF THE INVENTION

When a solution or dispersion of terephthalic acid is reacted with gaseous ethylene glycol the reaction is carried out at atmospheric pressure and has a satisfactory reaction rate without undesirable side reactions. The features of the present invention are that terephthalic acid is dissolved or dispersed in a suitable third component which is liquid under reaction conditions and that ethylene glycol is reacted with terephthalic acid at a temperature higher than the dew point of ethylene glycol.

The third component which can dissolve or disperse terephthalic acid may include a material capable of forming BHET by reaction with ethylene glycol under reaction conditions. It may include BHET and other terephthalate, for example, dimethyl terephthalate, diethyl terephthalate, monomethyl terephthalate and methylethyl terephthalate.

The amount of the third component employed is not critical as long as it can form a dispersion of terephthalic acid under reaction conditions. It is preferred that the amount of the 3rd component be greater than the amount of terephthalic acid.

The process according to the present invention is carried out by maintaining the solution or dispersion of terephthalic acid at a temperature above the dew point of ethylene glycol under reaction conditions and by introducing ethylene glycol into the solution or dispersion.

The ethylene glycol is introduced into the dispersion or solution in either liquid or gaseous state. If introduced as a liquid, the ethylene glycol becomes gaseous in the system. The temperature of the ethylene glycol to be introduced is not specified, but it is preferred to warm it. The gaseous ethylene glycol can be diluted with a carrier gas inert to the reaction, such as nitrogen, carbon dioxide, or steam, or mixtures thereof.

The rate at which the ethylene glycol is fed into the reaction system will vary widely, depending upon the type of reaction system, for example, gaseous or liquid ethylene glycol, and the design of the reaction apparatus. The rate, however, should be so selected as to insure that the ethylene glycol gas and solution or dispersion of the terephthalic acid are contacted sufficiently.

It has been found that a suitable rate for introducing ethylene glycol is at a space velocity of from 10 to 1000 hour$^{-1}$.

The reaction of terephthalic acid and ethylene glycol is carried out at a temperature which is above the dew point of ethylene glycol under the prevailing reaction conditions. It is preferred that the reaction be carried out under atmospheric pressure and at a temperature above 197° C., the boiling point of ethylene glycol. Elevated and reduced pressure, of course, may be employed, for example, at 230–240° C. under 2–3 kg./cm.$^2$, at 240–260° C. under 3–4 kg./cm.$^2$ and at 198°–250° C. under 760–300 mm. Hg.

When ethylene glycol is introduced into the reaction system with a carrier gas, the reaction can be carried out at a temperature below the boiling point of ethylene glycol.

According to this invention the reaction is carried out and proceeds at a temperature above the dew point of ethylene glycol in a gas-liquid reaction system.

The amount of ethylene glycol dissolved in the solution or dispersion varies to some extent depending upon the reaction conditions; generally, it is about 0.1 mole per mole of terephthalic acid.

The reaction of this invention can be carried out in the presence of or without catalyst, but the use of a catalyst is preferred. Any catalyst for esterification and polycondensation known in the art can be employed. Suitable catalysts include antimony oxide, calcium acetate and organic titanium compounds, and the proportion is generally, 0.001–0.5% by weight of the terephthalic acid.

In many cases, the BHET produced in the reaction is a mixture of dimer to hexamer; monomer or a prepolymer having a higher degree of polymerization may be obtained depending upon reaction conditions.

The process according to this invention is carried out either in a batch or a continuous system. Terephthalic acid dissolved or dispersed in a suitable third component or terephthalic acid and the third component, separately, are introduced into the reaction vessel and the reaction system is maintained at a temperature above the dew point of ethylene glycol.

Then, the ethylene glycol is introduced into the solution or dispersion under agitation.

The ethylene glycol can be introduced in the form of gas, gas incorporated in a carrier gas, or in the liquid state. If introduced as a liquid, the liquid immediately changes into gas in the system. If an alkyl terephthalate other than BHET is employed as the third component, it may react with ethylene glycol to form BHET. Unreacted ethylene glycol, the carrier gas, if any and water formed in the reaction are removed from the system. Then, the ethylene glycol is separated from the water and recycled to the reaction system. The BHET or BHET-containing liquid produced in the reaction vessel is recovered.

According to this invention high quality BHET is produced more rapidly. In the process, terephthalic acid is dissolved or dispersed in a third component and ethylene glycol is contacted in the gaseous state with the solution or dispersion so obtained.

Thus, the reaction system is a gas-liquid mixture and a high reaction temperature can be employed, even under atmospheric pressure, and a high reaction rate is obtained.

Furthermore, because a reaction temperature above the dew point of ethylene glycol is selected no excess ethylene glycol is present in the reaction system and, accordingly, no undesirable side reactions occur. Water produced in the reaction is readily removed from the system. Volatile impurities, such as acetaldehyde formed by decomposition of ethylene glycol and crotonaldehyde formed from acetaldehyde, are removed from the system. Thus, BHET of high purity is obtained.

DESCRIPTION OF THE PREFERRED EMBODIMENTS

Preferred embodiments of this invention will be explained by way of examples. It should be understood that the examples are given only for explanation and are not intended to limit this invention as many modifications can be made.

Example 1

Figure 1:
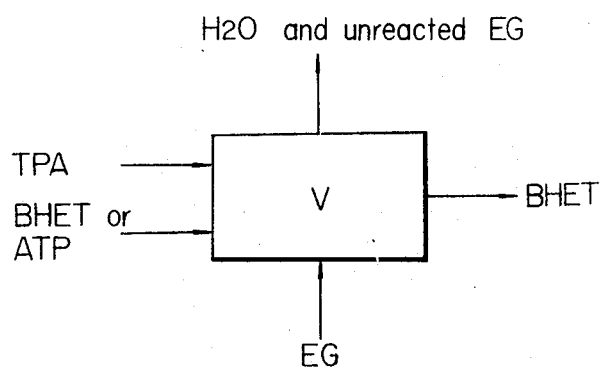
FIGS. 1 to 3 show flow diagrams of preferred embodiments in the process of this invention.

1.5 kg. of high purity BHET obtained from terephthalic acid and ethylene oxide and having a melting point of 110° C. and 1.0 kg. of high purity terephthalic acid were introduced into a reaction vessel with agitator, as shown in FIG. 1. The reaction mass was heated to 235° C. by means of an oil-bath jacket and ethylene glycol vapor heated to the same temperature was introduced at a space velocity of 300–600 hr.$^{-1}$ with strong agitation.

Water formed in the reaction and excess ethylene glycol vapor were removed from the reaction system. 60 minutes after start of the reaction, the terephthalic acid was completely dissolved, and then the reaction was continued 20 minutes more to obtain transparent and colorless BHET.

The product thus obtained was a precondensate having 2 to 3 terephthalic acid units per molecule and the degree of esterification was about 94%.

The resulting BHET was polycondensed in the presence of 0.05% antimony trioxide and 0.07% triphenyl phosphate, by weight of BHET, at a temperature of 275–280° C. in a vacuum to obtain colorless polyethylene terephthalate having a softening point of 262° C.

Example 2

Figure 2:
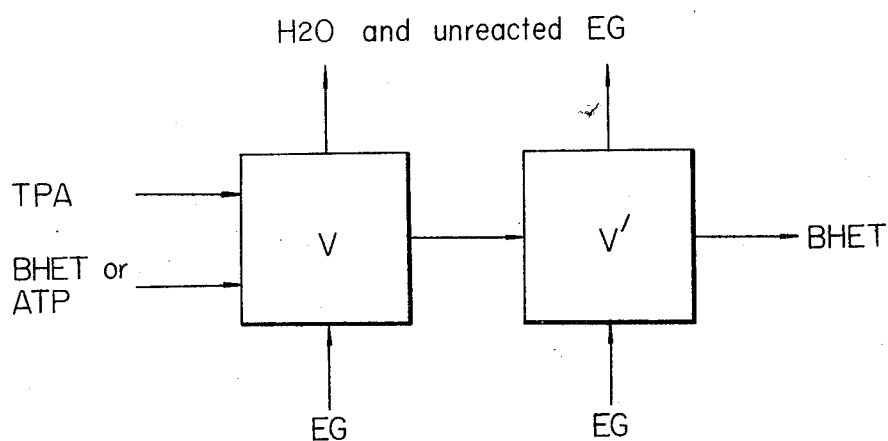

1 kg. of BHET produced in Example 1 was introduced into first and second reaction vessels, as shown in FIG. 2, respectively, and the vessels were heated to a temperature of 235° with agitation. Additional terephthalic acid was introduced into the first vessel at a rate of 1 kg. per hour, while ethylene glycol vapor preheated to 235° C. was introduced into both vessels at a space velocity of 360 hr.$^{-1}$. The mass in the first vessel flowed down into the second vessel by gravity at such a rate as to maintain a constant level in the first vessel; at the same time BHET was recovered from the second vessel at a rate of 1.3 kg. per hour. During the reaction water formed in the reaction and excess ethylene glycol was removed from both vessels. Thus, the charge of the reactants and discharge of the product were balanced. The product so obtained was an oligomer having a degree of esterification of about 93% from which colorless polyethylene terephthalate having a softening point of 261° C. was produced by polycondensation in a vacuum using a catalyst.

Example 3

1.2 kg. of BHET produced from dimethyl terephthalate and ethylene glycol in the presence of calcium acetate as catalyst and 1 kg. of terephthalic acid were introduced into the reaction vessel and heated to 250° C. Other conditions were the same as in Example 1. BHET having 3 to 4 terephthalic acid units and a degree of esterification of 95% was obtained.

The BHET thus produced was condensed according to the procedures disclosed in Example 1 to colorless polyethylene terephthalate having a softening point of 260°.

Example 4

Figure 3:
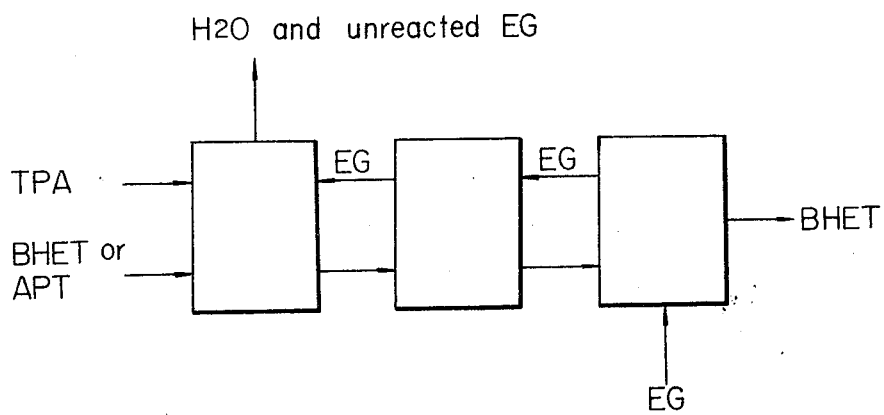

In this example three reaction vessels connected in series were employed, as shown in FIG. 3. 1 kg. of BHET produced in Example 3 was introduced into each of the three vessels and heated to 235° C. with agitation. Terephthalic acid was introduced into the first vessel at a rate of 1.2 kg. per hour while ethylene glycol vapor preheated to 235° C. was introduced to the third vessel at a space velocity of 150 hr.$^{-1}$ under pressure of 2 kg./cm.$^2$. Unreacted ethylene glycol vapor exhausted from the third vessel was passed through the second and first vessels in order. The reaction mass in the vessels flowed down from the first to the second and third in order by gravity flow. From the third vessel BHET was recovered at a rate of 2.06 kg. per hour. The 0.5 kg. per hour thereof was recycled to the first vessel so as to be mixed with the initial charging. Thus continuous operation was carried out successfully. The resulting BHET was of high purity and had terephthalic acid units of 2–3 per mole and degree of esterification of 97%.

The product was polycondensated as disclosed in Example 1 to obtain colorless polyethylene terephthalate having a softening point of 260°.

Example 5

A single reaction vessel with agitator, as shown in the drawing, was charged with 1.2 kg. of dimethyl terephthalate, 1.0 kg. of terephthalic acid and a small amount of trans-esterification catalyst and heated to a reaction temperature of 240° C.; other procedures were carried out as in Example 1. The degree of esterification of the resulting BHET was 94% and it had terephthalic acid units of 2–3.

The BHET thus obtained was a polycondensate forming a colorless polyethylene terephthalate having a melting point of 260° C.

We claim:
1. A process for producing bis($\beta$-hydroxyethyl)-terephthalate or a prepolymer thereof which comprises:
   (a) dissolving or dispersing terephthalic acid in a liquid essentially consisting of lower-alkyl terephthalate, bis($\beta$-hydroxyethyl) - terephthalate, bis($\beta$-hydroxyethyl)-terephthalate prepolymer, or a mixture thereof;
   (b) reacting said terephthalic acid while dissolved or dispersed in said liquid at a temperature of 198° to 280° C., with ethylene glycol by introducing said ethylene glycol into said liquid in gaseous form at said temperature, the reaction being carried out under conditions in which said temperature is higher than the dew point of said ethylene glycol.
2. The process according to claim 1, in which said liquid includes dimethyl terephthalate, diethyl terephthalate, monomethyl terephthalate or methyl ethyl terephthalate.
3. The process according to claim 1, in which said ethylene glycol is introduced into said liquid at a space velocity between 10 and 1000 hr.$^{-1}$.
4. The process according to claim 1, in which said ethylene glycol is introduced into said liquid at a space velocity between 150 and 600 hr.$^{-1}$.
5. The process according to claim 1, in which said reaction is carried out in the presence of an esterification catalyst.

References Cited
UNITED STATES PATENTS

| | | | |
|---|---|---|---|
| 3,050,533 | 8/1962 | Munro et al. | 260—475 |
| 3,185,669 | 5/1965 | McKinney | 260—475 |
| 3,442,868 | 5/1969 | Ogata et al. | 260—475 |
| 3,457,297 | 7/1969 | Muller et al. | 260—475 |
| 3,427,287 | 2/1969 | Pengilly | 260—475 |
| 3,496,146 | 2/1970 | Mellichamp | 260—475 |
| 3,497,473 | 2/1970 | Kemkes | 260—475 |

FOREIGN PATENTS

| | | | |
|---|---|---|---|
| 776,282 | 6/1957 | Great Britain | 260—475 |
| 977,426 | 12/1964 | Great Britain | 260—475 |
| 1,013,034 | 12/1965 | Great Britain | 260—475 |

LORRAINE A. WEINBERGER, Primary Examiner

E. J. SKELLY, Assistant Examiner

U.S. Cl. X.R.

260—75 M